(12) United States Patent
Steinke

(10) Patent No.: US 7,862,070 B2
(45) Date of Patent: Jan. 4, 2011

(54) AIRBAG FLAP SYSTEM

(75) Inventor: Stefan Steinke, Herne (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 369 days.

(21) Appl. No.: 11/718,153

(22) PCT Filed: Oct. 28, 2005

(86) PCT No.: PCT/EP2005/011705

§ 371 (c)(1),
(2), (4) Date: Sep. 13, 2007

(87) PCT Pub. No.: WO2006/045635

PCT Pub. Date: May 4, 2006

(65) Prior Publication Data

US 2008/0012269 A1    Jan. 17, 2008

(30) Foreign Application Priority Data

Oct. 29, 2004  (DE) ................. 10 2004 053 132

(51) Int. Cl.
*B60R 21/20* (2006.01)
(52) U.S. Cl. ................................. 280/728.3
(58) Field of Classification Search .............. 280/728.3, 280/732
See application file for complete search history.

(56) References Cited

U.S. PATENT DOCUMENTS

| | | | | |
|---|---|---|---|---|
| 4,327,937 A | * | 5/1982 | Scholz et al. | 280/728.3 |
| 4,334,699 A | * | 6/1982 | Patzelt et al. | 280/731 |
| 4,866,110 A | * | 9/1989 | Lee | 524/11 |
| 4,946,896 A | * | 8/1990 | Mitsuno et al. | 525/93 |
| 5,219,177 A | * | 6/1993 | Wang | 280/732 |
| 5,312,130 A | * | 5/1994 | Baba | 280/728.3 |
| 5,320,381 A | * | 6/1994 | Barnes et al. | 280/732 |
| 5,398,959 A | * | 3/1995 | Avila | 280/728.3 |
| 5,458,361 A | * | 10/1995 | Gajewski | 280/728.3 |
| 5,590,903 A | | 1/1997 | Phillion et al. | |
| 5,615,908 A | * | 4/1997 | Phillion et al. | 280/728.3 |
| 6,042,139 A | | 3/2000 | Knox | |
| 6,129,378 A | * | 10/2000 | Goto et al. | 280/732 |
| 6,152,480 A | * | 11/2000 | Iwanaga | 280/728.3 |
| 6,214,442 B1 | * | 4/2001 | Mizutani et al. | 428/156 |
| 6,250,669 B1 | * | 6/2001 | Ohmiya | 280/732 |
| 6,403,721 B1 | * | 6/2002 | Ding et al. | 525/191 |

(Continued)

FOREIGN PATENT DOCUMENTS

DE    196 40 434    4/1997

(Continued)

*Primary Examiner*—Paul N Dickson
*Assistant Examiner*—Robert A Coker
(74) *Attorney, Agent, or Firm*—Fay Kaplun & Marcin, LLP

(57) ABSTRACT

Described is an airbag flap system, and to a method for producing this airbag flap system. The airbag flap system contains an airbag cover and a carrier. The airbag cover comprises at least up to 80 percent by weight of a first plastic material, the carrier comprises at least up to 80 percent by weight of a second plastic material. The first plastic material thereby has a lower bending modulus than the second plastic material. The airbag cover has a border which extends at least partially into the carrier and is covered by the carrier on the upper and lower side.

24 Claims, 2 Drawing Sheets

U.S. PATENT DOCUMENTS

| | | | |
|---|---|---|---|
| 6,406,056 B2 * | 6/2002 | Yokota | 280/728.2 |
| 6,612,608 B2 * | 9/2003 | Schmidt et al. | 280/728.3 |
| 6,726,239 B1 * | 4/2004 | Teranishi et al. | 280/728.3 |
| 6,835,439 B1 * | 12/2004 | Kondo et al. | 280/732 |
| 6,914,094 B2 * | 7/2005 | Ding et al. | 524/423 |
| 7,007,970 B2 * | 3/2006 | Yasuda et al. | 280/728.3 |
| 2001/0026063 A1 | 10/2001 | Yokota | |

FOREIGN PATENT DOCUMENTS

| | | |
|---|---|---|
| DE | 198 35 612 | 11/1999 |
| DE | 101 10 654 | 2/2002 |
| EP | 1 002 703 | 5/2000 |

\* cited by examiner

AIRBAG FLAP SYSTEM

FIELD OF INVENTION

The present invention relates to an airbag flap system, comprising a carrier and an airbag cover, and to a method for producing this airbag flap system.

BACKGROUND INFORMATION

An airbag flap system comprising a carrier and an airbag cover is part of an airbag device which, incorporated in an automotive vehicle, has the object of protecting persons from severe injury in the case of an accident. For this reason, it is generally common nowadays to incorporate one or more airbag devices in an automotive vehicle.

In addition to the airbag flap system with the airbag cover contained therein, further important components of an airbag device are the airbag and the airbag trigger. These components must fulfil various tasks. The airbag trigger has the object of inflating the airbag as rapidly as possible upon being triggered. The airbag cover separates the airbag in the initial state from the interior of the automotive vehicle. One or more airbag flaps are integrated in the airbag cover. The airbag flaps have the object of enabling unfolding of the airbag into the interior. The airbag cover is generally connected to a housing in which the airbag and the airbag trigger are accommodated and positioned under the airbag flaps.

Because of the great importance of protecting the occupants, it is necessary to ensure as perfect a function as possible of the airbag device. It must be ensured inter alia that the airbag flaps integrated in the airbag cover do not impede unfolding of the airbag too greatly in order not to reduce the protective effect of the airbag. In the case of airbag flaps integrated in the airbag cover, it must also be ensured that these do not detach from the carrier thereof or even burst when the airbag is unfolding in order not to endanger the occupants in addition.

It is known to produce airbag covers from a soft synthetic resin, e.g. thermoplastic elastomers, and to insert this airbag cover in a carrier made of hard synthetic resin, e.g. polypropylene, as an insert. Predetermined breaking points are provided in the airbag cover by means of which airbag flaps which open upon unfolding of the airbag are defined. The soft synthetic resin of the cover provides a hinging effect during opening of the flaps and hence prevents detachment from the carrier. Because of the elastic properties of the soft synthetic resin, bursting of the airbag flaps is counteracted also as it were.

A disadvantage when using a hard synthetic resin as carrier and a soft synthetic resin as cover is that the synthetic resins adhere to each other poorly.

SUMMARY OF INVENTION

The present invention relates to an airbag flap system comprising a carrier and an airbag cover which provides a particularly strong and ageing-resistant connection between carrier and airbag cover in order to ensure a good hinging effect without detachment of the airbag flaps. In particular the invention provides a method with which such an airbag flap system can be produced economically.

The invention relates to an airbag flap system comprising an airbag cover with a visible end surface which can be directed towards an interior, and a carrier. According to the invention, the airbag cover of the airbag flap system comprises up to at least 80 percent by weight of a first synthetic resin. The carrier of the airbag flap system comprises up to at least 80 percent by weight of a second synthetic resin. The elastic bending modulus of the first synthetic resin is thereby lower than the elastic bending modulus of the second synthetic resin. The airbag cover has a border which protrudes into the carrier at least in regions. This border of the airbag cover is covered by the carrier on the upper and lower side.

There is understood by "synthetic resin" at present a pure form of a synthetic resin or a mixture of a plurality of synthetic resins, additives or supplements also being able to be added to the pure form or to the mixture, which are likewise regarded as being associated percentage-wise with the "first" or "second" "synthetic resin". In addition, the term "synthetic resin" is used synonymously with the term "plastic material".

For the reason that the airbag cover has a border which is covered by the carrier on the upper and lower side, airbag cover and carrier are keyed relative to each other. As a result, it is ensured that, despite poor adhesion properties of the two synthetic resins, the airbag cover and carrier are connected securely to each other even during unfolding of the airbag. As a result of the fact that the first synthetic resin has a lower elastic bending modulus than the second synthetic resin, hinging is achieved during opening of the airbag flaps. In particular the regions in which the border of the airbag cover is covered by the carrier on the upper and lower side are suitable as hinge axes.

An advantageous embodiment of the invention provides the provision of the border with one or more undercuts. The connection of airbag cover and carrier is fixed in addition by these undercuts.

A further advantageous embodiment of the invention provides the production of such undercuts in that holes are placed on the border. Holes are very easy to produce. These holes can be in particular through-holes equally simple to produce are also depressions.

A further advantageous embodiment of the invention provides the provision of the border with one or more knobs. The airbag cover is in addition fixed in the carrier by these knobs.

A further advantageous embodiment of the invention provides that one or more knobs end at the level of the front surface of the airbag cover. This is advantageous in particular for the production process of such an airbag flap system: if the prefabricated airbag cover is moulded with the carrier material, local mechanical stresses are produced because of the high temperature differences between airbag cover and carrier material and lead to bulging of the airbag cover, in particular of the border of the airbag cover. If the length of the knobs located on the border is adapted to the shape of the injection moulding die, said knobs counteract deformation of the border as spacers. Consequently, after completion of the injection and after cooling, in particular the front surface of the airbag cover is prevented from becoming curved in an undesired manner because of deformation of the border.

A further advantageous embodiment of the invention provides the provision of the front surface and/or the side of the airbag cover opposite the front surface with a net-like structure of webs. As a result of such a net-like structure of webs which can for example be rectangular or honeycomb-shaped, curving of the front surface as a result of thermal expansion is reduced. This net-like structure in addition effects reinforcement of the airbag cover with a low material outlay. Undesired tearing of the airbag cover during unfolding of the airbag is hence reduced. It is hence possible to dispense for example with a metal plate.

A further advantageous embodiment of the invention provides that the airbag cover has a collar at the edge of its front surface. In a production process of such an airbag flap system, the collar ensures with an injection moulding die which is correspondingly adapted thereto that, during moulding of the airbag cover with the carrier material, carrier material does not reach the front surface in an undesired manner.

A particularly advantageous embodiment of the invention provides that carrier and airbag cover are sealed relative to each other in a foam-impermeable manner.

It is consequently possible to apply a foam layer in common on carrier and airbag cover without having to adopt further measures which prevent the foam from penetrating into the otherwise present intermediate regions of the carrier-airbag cover in an undesired manner.

This foam-impermeablility can be achieved for example by moulding of the airbag cover with a synthetic resin material which forms the subsequent carrier.

A further advantageous embodiment of the invention provides that a single or multilayer top layer covers the carrier and the airbag cover. It is advantageous in particular for the optical appearance to cover the carrier and the airbag cover with a top layer. This top layer can comprise in particular plastic material, textile fibres or leather.

A further advantageous embodiment of the invention provides that the outer edge of the airbag cover is provided with one or more recesses. There should be understood here by the outer edge, the outer edge of the discharge channel of the airbag cover through which unfolding of the airbag is channelled, with the exclusion of the border which protrudes into the carrier. These recesses can be located both on the outer edge of the airbag cover below the border and on the outer edge of the airbag cover above the border. In an easy to produce form, the recesses can be produced in particular as blind holes. However also for example recesses with undercuts or channel-shaped recesses are possible. Advantageously, these recesses are aligned parallel to the front surface of the airbag cover. The carrier engages preferably in these recesses. As a result, the airbag is fixed additionally. During opening of the airbag cover due to unfolding of the airbag, the danger of the airbag detaching from the carrier is reduced when the border which protrudes into the carrier is torn off.

A further advantageous embodiment of the invention provides that the second synthetic resin has an elastic bending modulus in the range of 2000 MPa to 5000 MPa. The elastic bending modulus, as also in the case of the bending modulus data in the subsequent text, should be determined here according to DIN 53457. A synthetic resin with an elastic bending modulus of less than 2000 MPa is difficult to handle because of its low rigidity, a synthetic resin with an elastic modulus of more than 5000 MPa is brittle and tends to crack.

A further advantageous embodiment of the invention provides that the second synthetic resin has a thermal coefficient of expansion of $1*10^{-5}$ C.$^{-1}$ to $6*10^{-5}$ C.$^{-1}$. The thermal coefficient of expansion, as also in the case of the data in the subsequent text, should be determined here according to DIN 53752. A thermal coefficient of expansion of less than $1*10^{-5}$ C.$^{-1}$ can have the effect that the mechanical stresses between carrier and airbag cover become too high and lead to damage. A thermal coefficient of expansion of greater than $6*10^{-5}$ C.$^{-1}$ can have the effect that, if for example the carrier is part of a multicomponent system, such as e.g. in the interior cladding of an automotive vehicle, high forces can be exerted on the parts connected to the carrier, which can lead to deformation.

A further advantageous embodiment of the invention provides that the first synthetic resin has an elastic bending modulus in the range of 100 MPa to 1000 MPa. A synthetic resin with an elastic bending modulus of less than 100 MPa makes defined breaking of the airbag cover difficult during unfolding of the airbag. Because of increased rigidity and brittleness at low temperatures, a synthetic resin with an elastic bending modulus of more than 1000 MPa can impair the function of the airbag.

A further advantageous embodiment of the invention provides that the first synthetic resin has a thermal coefficient of expansion of approx. $8*10^{-5}$ C.$^{-1}$ to $20*10^{-5}$ C.$^{-1}$. A thermal coefficient of expansion of less than $8*10^{-5}$ C.$^{-1}$ means that the airbag cover is brittle and inclined to crack. A thermal coefficient of expansion of greater than $20*10^{-5}$ C.$^{-1}$ can have the result that the mechanical stresses between airbag cover and carrier become so great that the front surface of the airbag cover bulges visibly and the airbag flap system possibly is permanently damaged.

A further advantageous embodiment of the invention provides that the first synthetic resin comprises one or more synthetic resins of the groups thermoplastic olefins, thermoplastic styrenes, thermoplastic polyurethanes, thermostatic polyurethanes, thermoplastic polyesters or rubber. These synthetic resins are suitable for meeting the above-mentioned conditions for the elastic bending modulus and the thermal coefficient of expansion.

A further advantageous embodiment of the invention provides that the second synthetic resin comprises one or more synthetic resins of the groups thermoplastic olefins, thermoplastic styrenes, thermoplastic polyurethanes, thermostatic polyurethanes or rubber. These synthetic resins are suitable for meeting the above-mentioned conditions for the elastic bending modulus and the thermal coefficient of expansion.

A further advantageous embodiment of the invention provides that the carrier is an instrument panel.

In addition, the invention discloses a method for producing an airbag flap system, having the steps that firstly an airbag cover which comprises at least up to 80% of a first synthetic resin and which has a border 3 at least in regions, the border being provided with one or more knobs 5, is inserted into an injection moulding die 10 such that the border of the airbag cover does not touch the surface of the die in the closed injection moulding die 10, and the knobs 5 end at the level of the die surface so that the knobs 5, as spacers, reduce deformation of the border 3 in the injection moulding die, and in a next step, the airbag cover 1 is moulded with a carrier material, the carrier material comprising at least up to 80% of a second synthetic resin.

Preferably, the second synthetic resin has a higher elastic bending moment than the first synthetic resin.

An airbag cover with the above-mentioned features is positioned in this way in an injection moulding die such that, after moulding, the border including the knobs protrude into the carrier. The knobs which are located on the border of the airbag cover preferably contact the injection moulding die with both ends and consequently reduce deformation of the border during moulding (direct contact between knobs and die surface of the injection moulding die is in fact very advantageous but not absolutely necessary. The greater however is the spacing between the ends of the knobs and the die surface, the greater the degree of deformation of the border can be).

It is particularly advantageous if the knobs, in comparison to the gap size of the closed die in which they are positioned, have a slight excess dimension. As a result a clamping effect is produced.

In addition to reducing the deformation of the border, the knobs fix the airbag cover in the carrier material. The latter makes it possible in particular also to use synthetic resins for carrier and airbag cover which do not adhere to each other at all or only poorly. The connection between airbag cover and carrier can be ensured according to the invention via a form-fitting connection of the two components.

It is not absolutely necessary for the knobs to touch the die surface on both sides. It is also possible for the knobs to be disposed only on one side of the border and to abut only on one surface side of the die. This is possible in particular when the injection channel is positioned in the die such that, during injection of a plastic material, the plastic material exerts a pressure on the border by means of which the border is pressed in the direction of the die surface on which the knobs abut, i.e. the border is supported.

The knobs can be varied in their shape, for example configured also as short webs. It must be ensured however that the knobs should not be able to impede the flow of the synthetic resin material too greatly during moulding with the material of the carrier because of their dimensions. For this reason, a multiplicity of knobs/webs with small dimensions is recommended above all.

Preferably the knobs have a diameter of approx. 1.5 mm to 2 mm and a height of approx. 2 mm. These dimensions are of course dependent upon the component and can basically be varied fairly widely. In order that knobs of this type do not have too strong an effect as flow brakes during injection of a plastic material into the die, diameters of less than 5 mm are recommended.

Furthermore, uniform distribution of the knobs on the circumference of the border of the component and hence uniform positioning of the knobs on the die surface is advantageous.

The knobs can be connected in one piece to the border or be fixed subsequently on the border, for example by gluing.

A further advantage of this method is that an airbag flap system can be produced with a few steps and particularly economically, said method meeting the requirements of such a system, such as e.g. production of a secure connection of airbag cover and carrier, airbag cover and carrier having different elastic bending moduli corresponding to their tasks, and also ensuring as smooth a front surface of the airbag cover as possible.

Basically the method is not restricted to production of an airbag flap system. It can also be used for production of other multipart components in the case of which in particular a stable and impermeable, in particular foam-impermeable, connection of the individual elements is important.

An advantageous development of the method provides that the airbag cover is produced preferably in a single process step, by injection moulding of a thermoplastic synthetic resin material.

BRIEF DESCRIPTION OF DRAWINGS

The invention is now explained with reference to several Figures. The Figures show.

DETAILED DESCRIPTION

Figure 1:
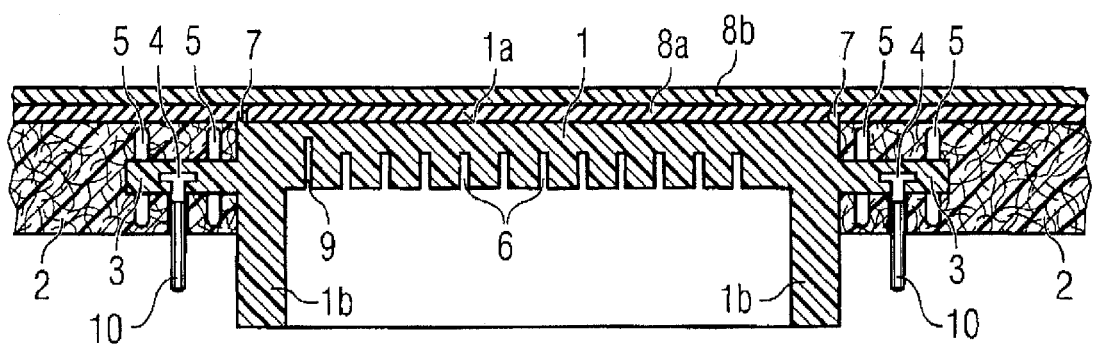
FIG. 1 shows an airbag flap system with an airbag cover in cross-section according to an exemplary embodiment of the present invention.

FIG. 1 shows schematically a cross-section of an airbag flap system according to the teaching of the invention. An airbag cover (1) with a flat front surface (1a) directed towards the interior and made of 100 percent by weight of thermoplastic polyester elastomer with an elastic bending modulus of 600 MPa and a linear thermal coefficient of expansion of $14*10^{-5}$ $C.^{-1}$ is surrounded on the edge-side by a carrier (2) made of 70 percent by weight of polypropylene and 30 percent by weight of glass fibre component, this synthetic resin formed from polypropylene and glass fibre having an elastic bending modulus of 3500 MPa and a thermal coefficient of expansion of $2.5*10^{-5}$ $C.^{-1}$.

The airbag cover (length 312 mm, width 216 mm) has a border (3) formed as a web (width on the longitudinal side of the airbag cover: 28 mm, width on the broad-side of the airbag cover: 32 mm) which protrudes into the carrier and is covered by the carrier on the upper and lower side. In the border there are through-holes (4) set centrally with a diameter of 10 mm, said through-holes acting as undercuts and in addition fixing the airbag cover in the carrier. The border also contains a plurality of knobs (5) which are disposed almost continuously in two rows in pairs between the individual through-holes. The knobs end at the level of the front surface of the airbag cover, the other ends lie likewise in a common plane. Two oppositely situated metal bridges with respectively two screws (10) are integrated in the border. These screws are provided for the purpose of mounting an airbag module on the cover.

In the outer frame of the airbag cover, a plurality of blind holes (11) are provided circumferentially. Further fixing of the airbag cover in the carrier is achieved by means of these blind holes. In addition, the airbag cover is configured such that it protrudes beyond the carrier (2) with its lower frame (1b) with the purpose of channelling the unfolding of the airbag.

The front surface (1a) of the airbag cover (1) has, at the edge, a collar (7) with the height 1 mm and the width 0.5 mm. During moulding with the carrier material, the carrier material is consequently prevented from reaching the front surface in an undesired manner.

The side which is situated opposite the front surface of the airbag cover is provided with a net-like structure (6) of rectangular webs apart from a narrow outer edge. The net-like structure of rectangular webs has a box size of 8 mm×8 mm, the width of the webs is 1 mm, the elevation of the structure 6 mm.

As an alternative, also a honeycomb structure with comparable dimensions is possible. Furthermore, so-called lines of weakness (9) are notched into the outer edge of the side opposite the front surface of the airbag cover. A defined opening of the cover during unfolding of the airbag is consequently ensured. The entire course of these lines of weakness is illustrated in a subsequent Figure.

Basically the above-indicated dimensions of the net-like structure can vary. The range of 4 mm to 10 mm for the elevation of the webs has proved to be advantageous, 0.5 mm to 3 mm for the width of the webs and 30 mm² to 80 mm² for the surface area of an individual honeycomb. These values apply in particular also to honeycomb shapes other than the rectangular shape described above.

In this embodiment, the net-like structure is connected in one piece to the airbag cover. For example, and also preferred according to the invention, the airbag cover is produced together with the net-like structure in a single injection moulding process.

As an alternative, it is also possible to apply such a structure subsequently, for example by welding or gluing. However this requires additional operational steps.

The airbag cover (1) and the carrier (2) are covered over the entire surface with a two-layer top layer (8). The first layer (8a) comprises a 3 mm thick polyurethane foam, the second layer (8b) a 1 mm thick polyvinylchloride.

Figure 2:
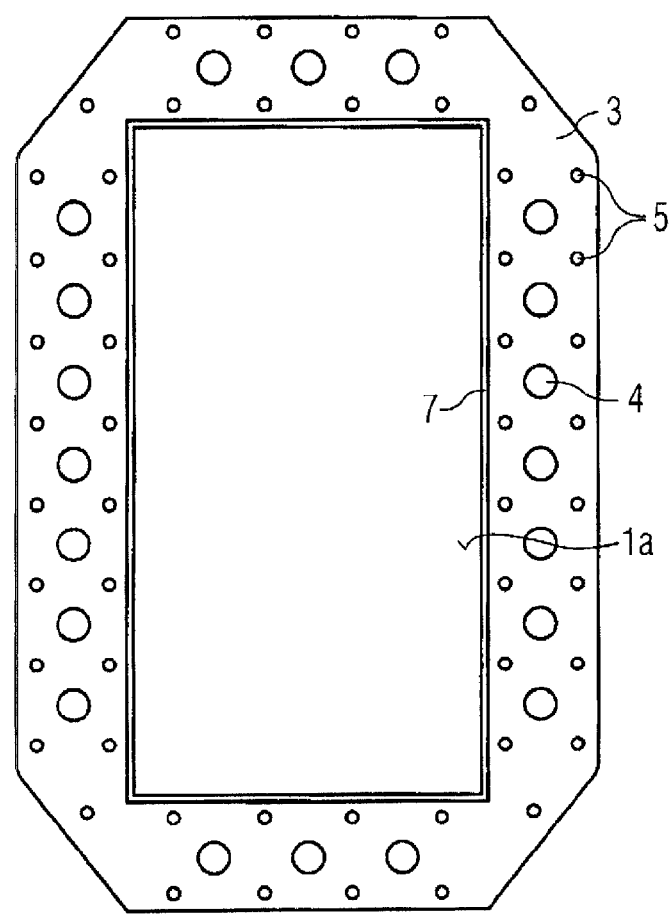
FIG. 2 shows the airbag cover of FIG. 1 in plan view.

FIG. 2 shows the airbag cover (1) of FIG. 1 in plan view. The Figure shows that the web-shaped border (3) in the embodiment is a continuous region. The undercuts (4) and the knobs (5) are disposed along the entire border. The collar (7) is located at the edge of the front surface of the airbag cover.

Figure 3:
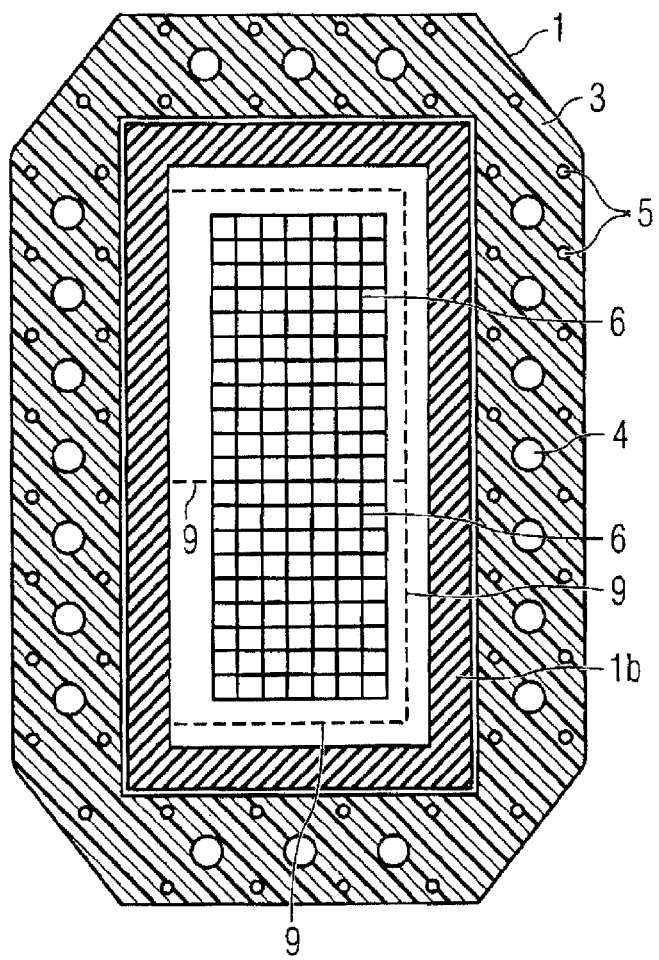
FIG. 3 shows the airbag cover of FIG. 1 in a view from below.

FIG. 3 shows the airbag cover (1) of FIG. 1 in a view from below. In this view, the side opposite the front surface with the network of rectangular recesses (6) is visible. The cover is notched along so-called lines of weakness (9). A defined opening of the cover during unfolding of the airbag is consequently achieved.

An embodiment of the method according to the invention for producing an airbag flap system is intended to be described subsequently likewise with reference to a Figure.

In a first step of the method, an airbag cover which comprises 100 percent by weight of thermoplastic polyester elastomer and has a web-shaped border with knobs disposed predominantly in two rows is positioned in an injection moulding die. The airbag cover (1) is inserted into the die such that the border of the airbag cover (1), in the closed injection moulding die, does not touch the surface of the die but the knobs (5) touch the surface of the injection moulding die.

Figure 4:
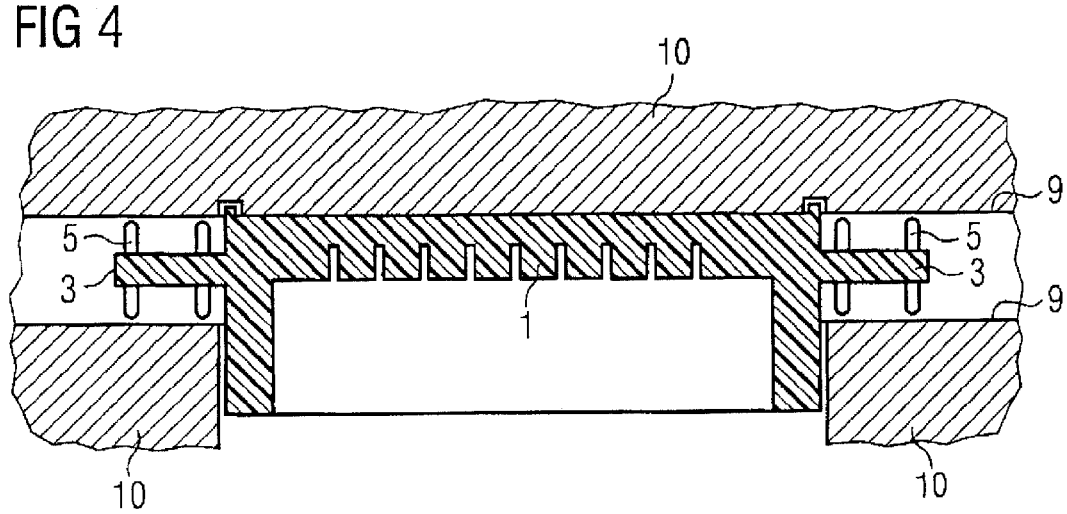
FIG. 4 shows the airbag cover positioned in the injection moulding die.

FIG. 4 shows the airbag cover (1) positioned in the injection moulding die (10).

According to the method, the airbag cover (1) is moulded with the carrier material polypropylene in the next step. During moulding, the polypropylene is at temperatures of approx. 190° C., whereas the airbag cover is at room temperature. Because of the high temperature difference of airbag cover and the carrier material, the danger exists that the border (3) would be greatly deformed. Due to the function of the knobs as spacers, such a deformation is counteracted.

The airbag cover (1) with border (3), knobs (5) and net-like structure (6) was produced in advance in a single process step by injection moulding of the above-indicated synthetic resin material.

The invention claimed is:

1. An airbag flap system, comprising:
an airbag cover with a visible-side front surface which is directable towards an interior; and
a carrier connected securely to the airbag cover even during unfolding of an airbag,
wherein the airbag cover comprises at least up to 80 percent by weight of a first plastic material, the carrier comprising at least up to 80 percent by weight of a second plastic material, the first plastic material having a lower elastic bending modulus than the second plastic material, the airbag cover having a border which protrudes into the carrier at least in regions, the border of the airbag cover being covered by the carrier on upper and lower sides to ensure the secure connection of carrier and airbag cover when the airbag is unfolding.

2. The airbag flap system according to claim 1, wherein the border has at least one undercut.

3. The airbag flap system according to claim 2, wherein the at least one undercut is least one hole in the border.

4. The airbag flap system according to claim 1, wherein the border has at least one knob.

5. The airbag flap system according to claim 4, wherein the at least one knob ends at a level of the front surface of the airbag cover.

6. The airbag flap system according to claim 1, wherein at least one of the front surface and a side of the airbag cover which is opposite the front surface has a net-like structure of webs for reinforcement.

7. The airbag flap system according to claim 1, wherein the airbag cover has a collar at the edge of the front surface.

8. The airbag flap system according to claim 1, wherein the airbag cover and carrier are sealed relative to each other in a foam-impermeable manner.

9. The airbag flap system according to claim 1, wherein the carrier and the airbag cover are covered by a top layer having at least one layer.

10. The airbag flap system according to claim 1, wherein an outer edge of the airbag cover has at least one recess.

11. The airbag flap system according to claim 1, wherein the second plastic material has an elastic bending modulus in a range between 2000 MPa and 5000 MPa.

12. The airbag flap system according to claim 1, wherein the second plastic material has a thermal coefficient of expansion between $1*10-5°$ C.-1 and $6*10-5°$ C.-1.

13. The airbag flap system according to claim 1, wherein the first plastic material has an elastic bending modulus in a range between 100 MPa and 1000 MPa.

14. The airbag flap system according to claim 1, wherein the first plastic material has a thermal coefficient of expansion between $8*10-5°$ C.-1 and $20*10-5°$ C.-1.

15. The airbag flap system according to claim 1, wherein the first plastic material comprises at least one plastic material of groups one of thermoplastic olefins, thermoplastic styrenes, thermoplastic polyurethanes, thermostatic polyurethanes, thermoplastic polyesters and rubber.

16. The airbag flap system according to claim 1, wherein the second plastic material comprises at least one plastic material of groups one of thermoplastic olefins, thermoplastic styrenes, thermoplastic polyurethanes, thermostatic polyurethanes and rubber.

17. The airbag flap system according to claim 1, wherein the carrier is an instrument panel.

18. A method for producing an airbag flap system, comprising:
moulding an airbag cover in an injection moulding die with a carrier material,
wherein the airbag cover comprises at least up to 80% of a first synthetic resin, the airbag cover having a border at least in regions of the airbag cover, the border having at least one knob, the at least one knob being configured such that it reduces deformation of the border in the injection moulding die,
wherein the moulding step is performed in such a manner that the border including the at least one knob protrudes into a carrier, and
wherein the carrier material comprises at least up to 80% of a second synthetic resin, the second synthetic resin having a higher elastic bending modulus than the first synthetic resin.

19. The method according to claim 18, wherein the airbag cover is produced by injection moulding of a thermoplastic plastic material.

20. The method according to claim 19, wherein the airbag cover is produced in a single process step.

21. A method for producing an airbag flap system, comprising:
inserting an airbag cover, which comprises at least up to 80% of a first plastic material and has a border at least in regions of the airbag cover, the border having at least one knob, into an injection moulding die such that the border does not touch a surface of the die in a closed injection moulding die and the at least one knob ending at a level of the die surface so that the at least one knob reduces deformation of the border in the injection moulding die; and moulding the airbag cover with a carrier material, the carrier material comprising at least up to 80% of a second plastic material.

22. The method according to claim 21, wherein the airbag cover is produced by injection moulding of a thermoplastic plastic material.

23. The method according to claim 22, wherein the airbag cover is produced in a single process step.

24. An airbag flap system, comprising:
  an airbag cover with a visible-side front surface which is directable towards an interior; and
  a carrier connected securely to the airbag cover even during unfolding of an airbag,
  wherein the airbag cover comprises at least up to 80 percent by weight of a first plastic material, the carrier comprising at least up to 80 percent by weight of a second plastic material, the first plastic material having a lower elastic bending modulus than the second plastic material, the airbag cover having a border which protrudes into the carrier at least in regions, the border of the airbag cover being covered by the carrier on upper and lower sides to ensure the secure connection of carrier and airbag cover when the airbag is unfolding, and
  wherein the cover comprises lines of weakness for a predefined opening of the cover during unfolding of the airbag.

* * * * *